United States Patent
Kobayashi et al.

(10) Patent No.: US 7,478,699 B2
(45) Date of Patent: Jan. 20, 2009

(54) VEHICLE PASSENGER DETECTING DEVICE

(75) Inventors: Masatoshi Kobayashi, Tokyo (JP); Takahiro Kawakami, Tokyo (JP); Toshinori Yagi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 370 days.

(21) Appl. No.: 11/347,365

(22) Filed: Feb. 6, 2006

(65) Prior Publication Data

US 2006/0180376 A1 Aug. 17, 2006

(30) Foreign Application Priority Data

Feb. 16, 2005 (JP) ............................. 2005-038541
Oct. 25, 2005 (JP) ............................. 2005-309763

(51) Int. Cl.
 *B60R 21/015* (2006.01)
(52) U.S. Cl. ....................... 180/273; 280/735
(58) Field of Classification Search ............... 180/273, 180/271, 268, 282; 280/735; 701/45
See application file for complete search history.

(56) References Cited

U.S. PATENT DOCUMENTS 6,467,804 B2 * 10/2002 Sakai et al. ............... 280/735
6,557,424 B1 * 5/2003 Morell .................. 73/862.045
7,200,475 B2 * 4/2007 Bettwieser et al. ........... 701/45
7,239,950 B2 * 7/2007 Wanami et al. .............. 701/45

FOREIGN PATENT DOCUMENTS

JP 2003-246256 A 9/2003

* cited by examiner

*Primary Examiner*—Christopher Ellis
*Assistant Examiner*—Joseph Rocca
(74) *Attorney, Agent, or Firm*—Foley & Lardner LLP

(57) ABSTRACT

A vehicle passenger detecting device includes a judging circuit (6), which judges whether a passenger seated on a seat (1) is a child or not based on a load acting on each of areas of a seat portion (1*a*) of the seat for a vehicle, and the judging circuit (6), with a fastened sate of a seat belt (5*a*), judges whether or not a total load acting on the entire area of the seat portion is within a predetermined range, and when the total load is within the predetermined range, if a front outer load acting on a front outer area is a first threshold or more and the ratio of the front outer load to a front inner load acting on a front inner area is a second threshold or more, or the ratio of both outer loads acting on both of outer areas to both inner loads acting on both of inner areas is a third threshold or more, the judging circuit judges (6) that a seated passenger is a child.

8 Claims, 7 Drawing Sheets

FIG.2C
When adult is seated

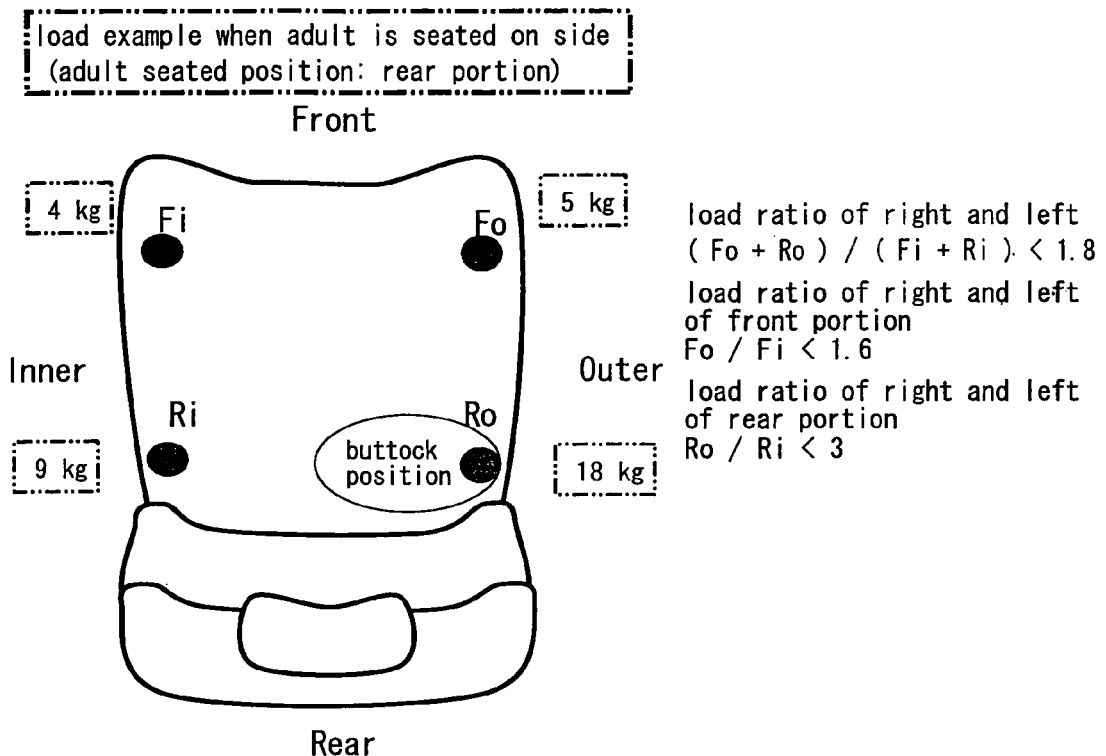

load example when adult is seated on side (adult seated position: rear portion)

load ratio of right and left
$(Fo + Ro) / (Fi + Ri) < 1.8$ load ratio of right and left of front portion
$Fo / Fi < 1.6$ load ratio of right and left of rear portion
$Ro / Ri < 3$

FIG.2D

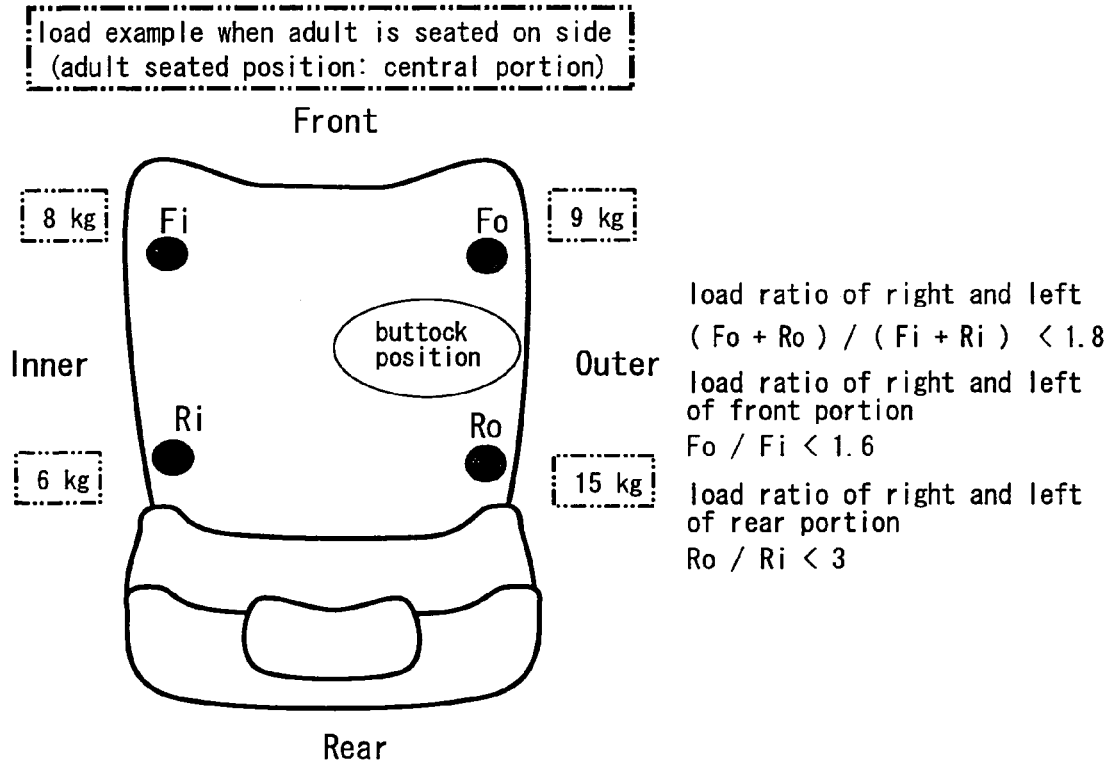

load example when adult is seated on side (adult seated position: central portion)

load ratio of right and left
$(Fo + Ro) / (Fi + Ri) < 1.8$ load ratio of right and left of front portion
$Fo / Fi < 1.6$ load ratio of right and left of rear portion
$Ro / Ri < 3$

VEHICLE PASSENGER DETECTING DEVICE

BACKGROUND

1. Field of the Invention

The present invention relates to a vehicle passenger detecting device, which determines whether or not a passenger seated on a seat of a vehicle is a child seated through a child restraint system such as a child seat, for example.

2. Description of Related Art

There has been, conventionally, known a passenger detecting device in which load sensors 3 are incorporated to four supporting leg portions 2 for supporting a seat 1 of a vehicle, respectively, so as to judge whether a passenger is an adult or a child by an output value of each of the sensors, as shown in FIG. 6 (for example, reference to page 3-4, FIG. 3 in JP-A-2003-246256).

When a seat portion 1a of the seat 1 is zoned into four areas from front to back and from side to side (front inner area, front outer area, rear inner area and rear outer area), each of the supporting leg portions 2 in which the load sensor 3 is incorporated is disposed corresponding to each of the areas, so as to support each of the areas. These supporting leg portions 2 are movable along a pair of seat rails 4, so the seat 1 is movable in a back and forth direction of the vehicle along the seat rails 4. In addition, the seat 1 is supported to be lockable in a predetermined back and forth position.

The weight of the passenger seated on the seat 1 is calculated from the total value of the detected value output from each of the load sensors 3. It is judged whether the passenger on the seat 1 is an adult or a child by the comparison of this calculated value with a threshold for judging an adult and a child.

In addition, if a child restraint system as a child seat (not shown) (hereinafter referred to as CRS) is installed on the seat 1 by a seat belt device 5, the CRS having stiffness tends to incline in the right and left direction by the pull force of the seat belt 5a of the seat belt device 5, so if the CRS is installed, a load difference is produced in the right and left of the seat portion 1a of the seat 1. Accordingly, the usage of the CRS can be detected.

On the contrary, if the passenger seated on the seat 1 is an adult, the tension of the seat belt 5a is absorbed by the body of the passenger, so if the seat belt device 5 is fastened, more particularly, the seat belt 5a is fastened, such a load difference is not produced as far as the passenger is seated on the central portion without being seated on one side of the seat portion 1a.

Therefore, it can be determined whether the passenger is a child or not by a load difference acting on the seat portion 1a of the seat 1 with the seat belt 5a is fastened.

If it is judged that the passenger is an adult, a passenger protection device such as an air-bag device is operated when possibly having an impact on the passenger. In addition, if it is judged that the passenger is a child, the operation of such a passenger protection device is controlled or blocked, so as to prevent the child from being damaged by the passenger protection device.

However, with the detecting device set forth in JP-A 2003-246256, if a lightweight adult is seated on one side of the seat 1a of the seat 1, a load difference to be produced in the right and left, i.e., the both sides, of the seat portion 1a approaches a load difference to be produced in a seat belt fastened state for installing the CRS. In this case, an adult and a child using the CRS may be misjudged.

SUMMARY

It is, therefore, an object of the present invention, to provide a vehicle passenger detecting device capable of accurately judging an adult or a child without causing a miss operation.

In order to achieve the above object, a vehicle passenger detecting device according to a first aspect of the present invention comprise a judging circuit, which judges whether a passenger seated on a seat is a child or not based on a load acting on each of areas of a front inner area, a front outer area, a rear inner area and a rear outer area of a seat portion of the seat for a vehicle, wherein a vehicle exterior side of the seat is disposed with a anchor, which connects a seat belt provided with a tongue plate to a body of the vehicle, and a vehicle interior side of the seat is disposed with a buckle in which the tongue plate is releasably locked, wherein the judging circuit, with a fastened sate of the seat belt, is configured to judge whether or not a total load acting on the entire area of the seat portion is within a predetermined range, and when the total load is within the predetermined range, if a front outer load acting on the front outer area is a first threshold or more and the ratio of the front outer load to a front inner load acting on the front inner area is a second threshold or more, or the ratio of both outer loads acting on both of the outer areas to both inner loads acting on both of the inner areas is a third threshold or more, the judging circuit is configured to judge that a seated passenger is a child.

According to the first aspect of the present invention, with the fastened state of the seat belt, at first, it is judged whether the total load acting on the entire area of the seat portion is in a predetermined range or not. If the total load exceeds an upper critical value of the predetermined range, the seated passenger is judged as an adult similar to a conventional device, and also if the total load underruns a lower critical value of the predetermined range, the seated passenger is judged as a child similar to a conventional device.

In addition, if the total load is within the predetermined range, basically, it can be judged as the usage of a CRS when a predetermined load difference is produced in the right and left in the front portion of the seat portion other than the driver seat, i.e., both of the side areas. However, if an adult seated on a passenger seat is seated significantly lean to the anchor side of the seat belt in the most rear portion of the seat portion of the seat, a judgment result similar to the above may be included.

In order to prevent a miss judgment by the above significant uneven sitting, such significant uneven sitting can be prevented by fastening the seat belt, so the difference between the front inner load acting on the front inner area and the front outer load acting on the front outer area is obtained as the ratio, with the fastened state of the seat belt, and it can be judged whether the CRS is used or not, i.e., whether the passenger is an adult or a child by the value of this ratio.

However, even though the seat belt is fastened, the sitting that an adult of the passenger seat is seated slightly lean to the anchor side, i.e., slight uneven sitting can not be prevented. In addition, by the slight uneven sitting of an adult, the front load ratio acting on the inner area and the outer area in the front portion is increased similar to the situation when using a CRS. However, the load acting on the front outer area detected by the slight uneven sitting of an adult is smaller than the load when using a CRS.

Accordingly, the minimum value of the front outer area when using a CRS is previously adopted as the first threshold. By appropriately setting the first threshold, when the load acting on the front outer area is less than the first threshold, it can be judged as the slight uneven sitting of an adult even though the ratio of the front outer load to the front inner load indicates a value of the second threshold or more.

Therefore, when the total load is within a predetermined range, if the front outer load is the first threshold or more and the ratio of the front outer load to the front inner load is the second threshold or more, the passenger on the seat can be judged as a child using a CRS.

In addition, when the total load is within a predetermined range, similarly, if the ratio of both outer loads to both inner loads acting on the seat portion of the seat is compared with the third threshold, the usage of CRS can be detected.

From the reason stated above, when the total load is within a predetermined range, by using both of the above judging methods, the usage of CRS, which can be detected by only using one of the judging methods, can be certainly detected, so a child using a CRS can be absolutely detected.

Therefore, according to the first aspect of the present invention, a miss judgment by uneven sitting of an adult is prevented, and the installing of a CRS can be certainly detected; thus, a vehicle passenger detecting device, which can reliably discriminate an adult and a child, can be obtained.

In one embodiment of the vehicle passenger detecting device according to the present invention, each of the areas of the seat portion of the seat for a vehicle is provided with a front inner area sensor, a front outer area sensor, a rear inner area sensor and a rear outer area sensor, which detect the load acting on each of the areas, wherein the judging circuit, with the fastened state of the seat belt, is configured to compare a total load value obtained by the area sensors of the entire area with both critical values, which prescribe the predetermined range, compare a front outer load value obtained by the front outer area sensor with the first threshold, compare the ratio of a front outer load value obtained by the front outer area sensor to a front inner load value obtained by the front inner area sensor with the second threshold, and compare the ratio of both outer load values obtained by both of the outer area sensors to both inner load values obtained by both of the inner area sensors with the third threshold.

For example, a distortion sensor can be used as the above sensor. The load acting on each of the areas of the seat can be appropriately detected by incorporating each of the sensors into supporting leg portions of the seat, for example.

In one embodiment of the vehicle passenger detecting device according to the present invention, an upper critical value, which prescribes an upper limit of the predetermined range, is obtained by the sum of weight of a heaviest child restraint system in child restraint systems prescribed by a regulation, a maximum fastening force of a child restraint system by a seat belt prescribed by a regulation, and a maximum weight of a child using a child restraint system prescribed by a regulation.

In one embodiment of the vehicle passenger detecting device according to the present invention, the first threshold is set to a minimum value of the front outer load value obtained by the front outer area sensor when fastening of the child restraint system by the seat belt.

More precise judgment can be achieved by setting the upper critical value and the first threshold as stated above.

In one embodiment of the vehicle passenger detecting device according to the present invention, the first threshold is set to about 3 kg.

In one embodiment of the vehicle passenger detecting device according to the present invention, the second threshold is set to about 1.9.

In one embodiment of the vehicle passenger detecting device according to the present invention, the third threshold is set to about 2.0.

For the above first to third thresholds, most suitable values can be set by an experiment, but highly accurate judgment can be, generally, achieved, by adopting the above values.

A vehicle passenger detecting device according to a second aspect of the present invention comprises a judging circuit, which judges whether a passenger seated on a seat is a child or not based on a load acting on each of areas of a front inner area, a front outer area, a rear inner area and a rear outer area of a seat portion of the seat for a vehicle, wherein a vehicle exterior side of the seat is disposed with a anchor, which connects a seat belt provided with a tongue plate to a body of the vehicle, and a vehicle interior side of the seat is disposed with a buckle in which the tongue plate is releasably locked, wherein the judging circuit, with a fastened state of the seat belt, is configured to judge whether a total load acting on the entire area of the seat portion is within a predetermined range or not, and when the total load is within the predetermined range, the judging circuit is configured to judge a seated passenger is a child if a ratio of both outer loads acting on both of the outer areas of the total load is a predetermined threshold or more, and the judging circuit changes the threshold depending on a size of the total load.

According to the second aspect of the present invention, when judging the seated passenger based on the ratio of both outer loads of the total load, the predetermined threshold of a judgment reference is changed depending on a size of the total load, so even though the total value becomes a load corresponding to an adult by fastening a CRS by the seat belt, it can be appropriately judged the installing of the CRS.

Especially, even though when a relatively heavy weight child is seated on the CRS, the judgment can be absolutely conducted.

Furthermore, a threshold having an allowance can be set with respect to a relatively light weight adult, so a miss judgment can be prevented.

Priority Claim

The present application is based on, and claims priority from, Japanese Patent Application No. 2005-038541, filed on Feb. 16, 2005, and Japanese Patent Application No. 2005-309763, filed on Oct. 25, 2005, the contents of which are hereby incorporated by reference herein in its entirety.

BRIEF DESCRIPTION OF THE DRAWINGS

FIG. 2C is an explanation view illustrating relationship between a seated position and loads when an adult is seated.

FIG. 2D is an explanation view illustrating relationship between a seated position and loads when an adult is seated.

DETAILED DESCRIPTION OF THE PREFERRED EMBODIMENTS

Hereinafter, the present invention will be described in detail along embodiments shown in FIGs. In addition, the reference numbers used in the above related art are used for the same portions in the following embodiments; thus, the detailed explanation will be omitted.

First Embodiment

Figure 6:
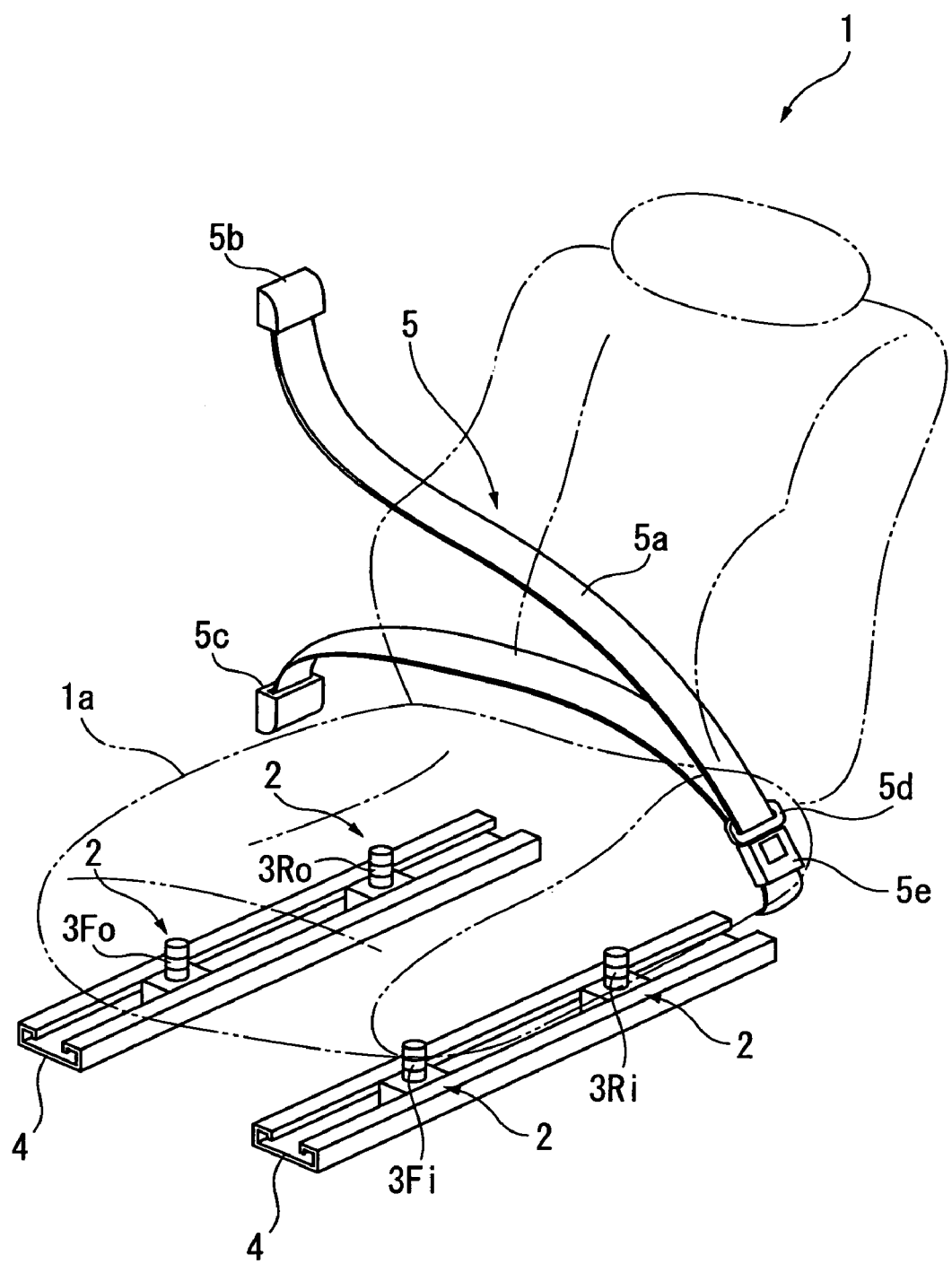
FIG. 6 is an explanation perspective view showing a vehicle seat in which a conventional passenger detecting device is provided.

A vehicle passenger detecting device 10 according to a first embodiment of the present invention comprises four load sensors 3(3Fo, 3Fi, 3Ro, 3Ri) incorporated in four supporting leg portions 2 of a seat portion 1a of a vehicle seat 1, respectively, similar to the one shown in FIG. 6, for example, and a judging circuit 6. As is conventionally known, the seat 1 is movable on a pair of seat rails 4 in a back and forth direction of a vehicle by each of the supporting legs 2, and is releasably locked in a predetermined back and forth direction.

The seat 1 is a front passenger seat. In the example shown in figures, the vehicle provided with the seat 1 is a left-hand vehicle of North America specification. Therefore, the right hand side of the passenger seated on the seat portion 1a of the seat 1 shown in FIG. 6 is the door window side, i.e., the vehicle exterior side, and the other side of this is the vehicle interior side.

The vehicle exterior side of the seat 1 is provided with a winder 5b, which winds one end of a seat belt 5a of a seat belt device 5, and an anchor 5c, which connects the other end of the seat belt 5a to a vehicle body (not shown). The vehicle interior side of the seat 1 is provided with a buckle 5c, which releasably locks a tongue plate 3c provided in the seat belt 5a.

Each of the load sensors 3(3Fo, 3Fi, 3Ro, 3Ri) incorporated into the supporting leg portions 2 can be constructed by a distortion sensor similar to the conventional one. Each of the load sensors 3 (3Fo, 3Fi, 3Ro, 3Ri) is incorporated in the supporting leg portions 2, which are provided to support each of areas, front inner area, front outer area, rear inner area and rear outer area, formed by dividing the seat plane of the seat portion 1a into four areas in a back and forth direction and a right and left direction of the vehicle.

Therefore, the front outer load sensor 3Fo provided in the supporting leg portion 2, which supports the outer area in the front portion of the seat portion 1a, i.e., the anchor side area, outputs an electric signal to the judging circuit 6 depending on the load Fo acting on the front outer area.

Correspondingly, the front inner load sensor 3Fi provided in the supporting leg portion 2, which supports the inner area in the front portion of the seat portion 1a, i.e., the buckle side area, outputs an electric signal to the judging circuit 6 depending on the load Fi acting on the front inner area. The rear outer load sensor 3Ro provided in the supporting leg portion 2, which supports the outer area in the rear portion of the seat portion 1a, i.e., the anchor side area, outputs an electric signal to the judging circuit 6 depending on the load Ro acting on the rear outer area. The rear inner load sensor 3Ri provided in the supporting leg portion 2, which supports the inner area in the rear portion of the seat portion 1a, i.e., the buckle side area, outputs an electric signal to the judging circuit 6 depending on the load Ri acting on the rear inside area.

The judging circuit 6, which receives output signals from each of the load sensors 3(3Fo, 3Fi, 3Ro, 3Ri) is connected to a buckle switch 7, which detects the fastening of the seat belt 5a, i.e., the fastening of the seat device 5, and an EEPROM 8, which stores data to calculate each of thresholds ($\alpha$th, $\beta$th, $\gamma$th, Fth and Ath) for judging whether the passenger on the seat portion 1a is an adult or a child, and weight W of the passenger on the seat portion 1a, in addition to various data required for the judgment.

The buckle switch 7 is incorporated into the buckle 5e of the seat belt device 5 shown in FIG. 6, and outputs an output signal to the judging circuit 6 till the connection is released after the tongue plate 5d of the seat belt 5 is locked in the buckle by inserting the tongue plate 5d into the buckle If the judging circuit 6 receives the output signals depending on the load acting on each of the areas of the front inner area, front outer area, rear inner area and rear outer area of the seat portion 1a from each of the load sensors 3(3Fo, 3Fi, 3Ro, 3Ri), the judging circuit 6 calculates passenger weight W by using the output signal values and data, which is stored in the EEPROM 8 to calculate passenger weight W, and then writes the calculated passenger weight W into the EEPROM 8.

Moreover, this passenger weight W is the total load acting on the entire area of the seat portion 1a of the seat 1.

With the calculation of passenger weight by this judging circuit 6, a summation value is basically obtained by the adding of the output signal values from each of the load sensors 3(3Fo, 3Fi, 3Ro, 3Ri). However, the passenger is, generally, seated on the seat 1 with the feet are placed on the floor of the vehicle, so sometimes the summation value showing the measurement weight is reduced compared with the value showing actual weight; thus, the reduced weight can be corrected by correction data stored in the EEPROM 8.

In addition, if the judging circuit 6 receives the output signal from the buckle switch 7, the judging circuit 6 detects the fastening of the seat belt 5a. If the judging circuit 6 detects the fastening of the seat belt 5a, the judging circuit 6 judges whether the passenger seated on the seat 1 is an adult or a child by the calculation using the output signals from each of the load sensors 3 (3Fo, 3Fi, 3Ro, 3Ri), the passenger weight W and each of the thresholds ($\alpha$th, $\beta$th, $\gamma$th, Fth, Ath) stored in the EEPROM 8.

FIGS. 2A to 2D show load examples acting on each of areas of the front inner area, front outer area, rear inner area and rear outer area of the seat portion 1a when the passenger is seated on this seat 1.

Figure 1:
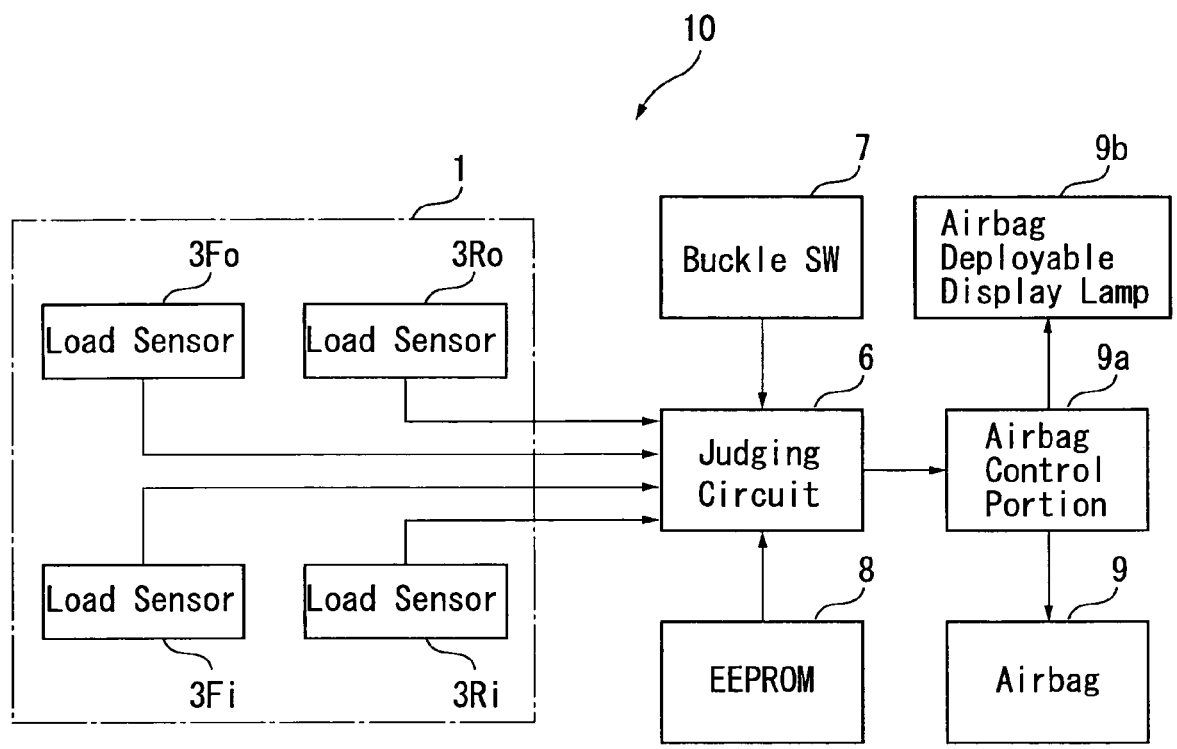
FIG. 1 is a block diagram showing a vehicle passenger detecting device according to the present invention.
Figure 2A:
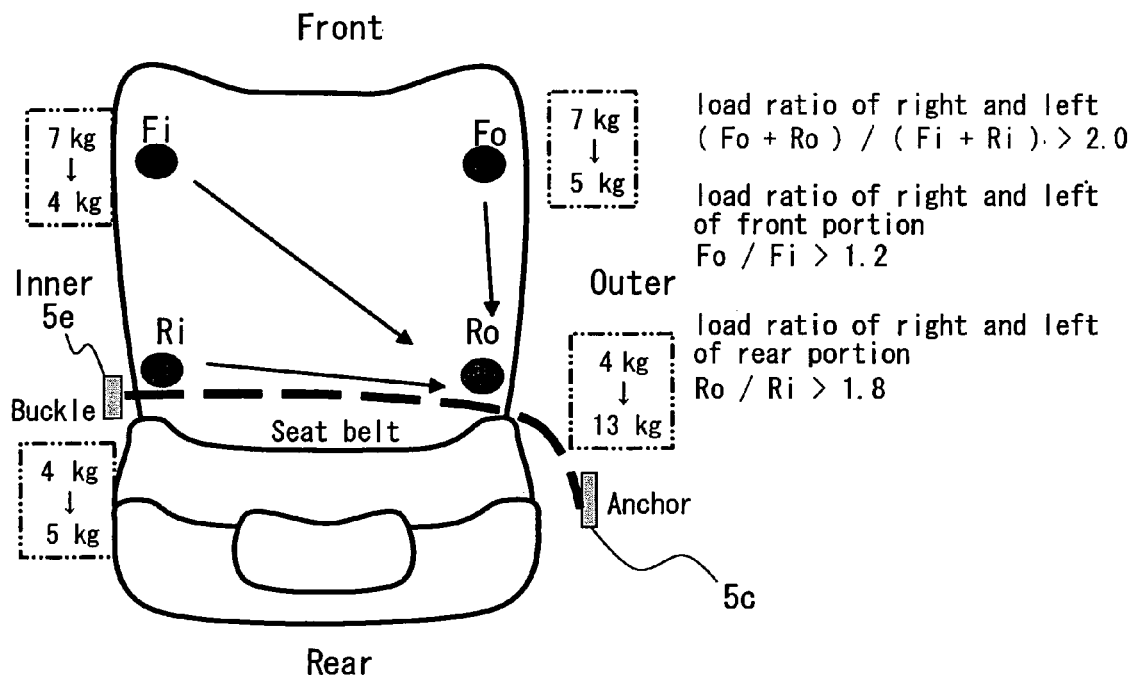
FIG. 2A is an explanation view illustrating relationship between a seat position and changes in fastening loads of a CRS by a seat belt for using the CRS according to the present invention.
Figure 2B:
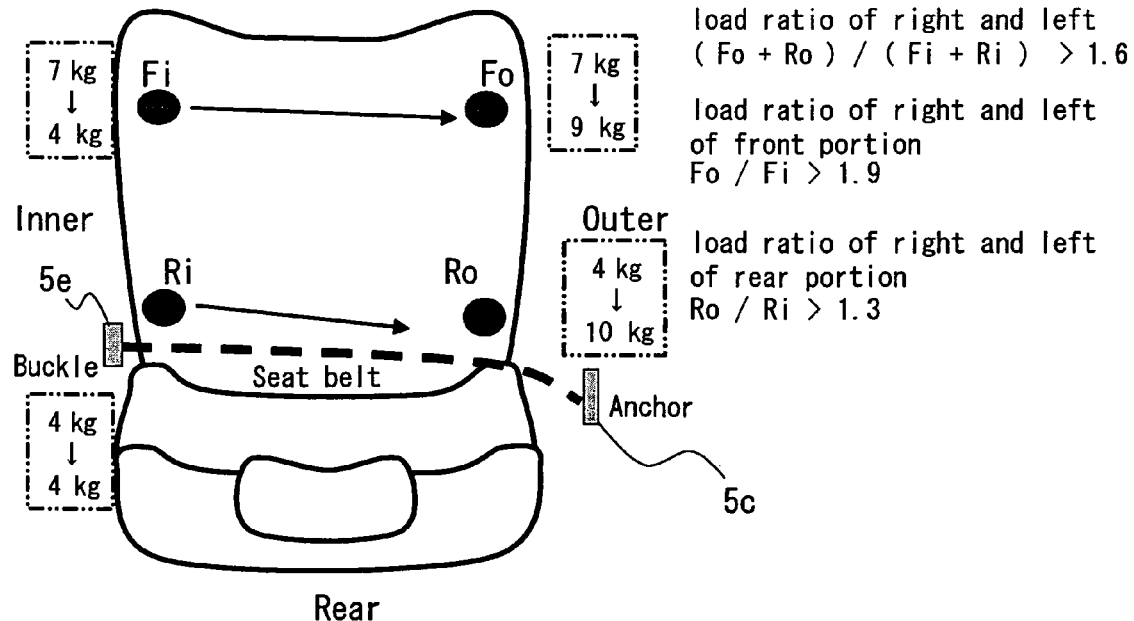
FIG. 2B is an explanation view illustrating relationship between a seat position and changes in fastening loads of a CRS by a seat belt for using the CRS according to the present invention.

FIGS. 2A and 2B show load examples when CRS (not shown) is installed on the seat 1 by the seat belt device 5, such that a child is seated on the seat 1 through the CRS. FIG. 2A is an example when the seat 1 is placed in the most front position, and FIG. 2B is an example when the seat 1 is placed in the most rear position.

As illustrated in FIG. 2A and FIG. 2B, before fastening the seat belt 5a, the loads Fi, Fo, Ri and Ro acting on each of the areas of the front inner area, the front outer area, the rear inner area and the rear outer area of the seat portion 1a indicate 7 kg, 7 kg, 4kg and 4 kg, respectively, regardless of the position of the seat 1.

However, with the seat belt 5a fastened state in which the tongue plate 5d of the seat belt device 5 is locked in the buckle 5e, if the seat 1 is positioned in the most front position, as illustrated in FIG. 2A, the load Fi of the front inner area is decreased from 7 kg to 4 kg, and the load Fo of the front outer area is decreased from 7 kg to 5 kg, but the load Ri of the rear inner area is increased from 4 kg to 5 kg, and the load Ro of the rear outside area is increased from 4 kg to 13 kg.

On the contrary, if the seat 1 is placed in the most rear position with the seat belt 5a fastened state, the load Fi of the front inner area is decreased from 7 kg to 4 kg, the load Fo of the front outer area is increased from 7 kg to 9 kg, the load Ri, 4 kg, of the rear inner area is unchanged, and the load Ro of the rear outer area is increased from 4 kg to 10 kg.

From the reason stated above, it is understand that, whichever the seat 1 is placed in the most front position and the most rear position, if the seat belt 5a is fastened, the load Ro of the rear outer area in which the anchor 5c of the seat portion 1a is provided is significantly increased by the pull force of the seat belt 5a.

In addition, from the above load examples, the flowing expressions are reached when the seat 1 is positioned in the most front position and when the seat 1 is positioned in the most rear position.

(When the Seat 1 is Positioned in the Most Front Position)

The load ratio of the right and left in the front portion of the seat portion 1a, i.e., the ratio of the load Fo acting on the front outer area to the load Fi acting on the front inner area, (Fo/Fi), is $$Fo/Fi > 1.2 \tag{1}$$

The load ratio of the right and left of the entire seat portion 1a, i.e., the ratio of the total value of the load Fo acting on the front outer area and the load Ro acting on the rear outer area to the load Fi acting on the front inner area and the load Ri acting on the rear inner area, ((Fo+Ro)/(Fi+Ri)), is $$(Fo+Ro)/(Fi+Ri) > 2.0 \tag{2}$$

The load ratio of the right and left in the rear portion of the seat portion 1a, i.e., the ratio of the load Ro acting on the rear outer area to the load Ri acting on the rear inner area, (Ro/Ri), is $$Ro/Ri > 1.8 \tag{3}$$

(When the Seat 1 is Positioned in the Most Rear Position)

The load ratio of the right and left in the front portion of the seat portion 1a, i.e., the ratio of the load Fo acting on the front outer area to the load Fi acting on the front inner area, (F/Fi), is $$Fo/Fi > 1.9 \tag{4}$$

The load ratio of the right and left of the entire seat portion 1a, i.e., the ratio of the total value of the load Fo acting on the front outer area and the load Ro acting on the rear outer area to the load Fi acting on the front inner area and the load Ri acting on the rear inner area, ((Fo+Ro))/(Fi+Ri)), is $$(Fo+Ro)/(Fi+Ri) > 1.6 \tag{5}$$

The load ratio of the right and left in the rear portion of the seat portion 1a, i.e., the ratio of the load Ro acting on the rear outer area to the load Ri acting on the rear inner area, (Ro/Ri), is $$Ro/Ri > 1.3 \tag{6}$$

With respect to these, FIGS. 2C and 2D illustrates load examples with an adult without using a CRS is seated on the seat 1. FIG. 2C is an example when an adult is seated lean to one side (uneven sitting) in the rear portion of the seat 1, i.e., the anchor side of the rear portion. FIG. 2D is an example when an adult is seated lean to the anchor side in the central portion of the front and rear of the seat 1. With the examples seated by an adult, the pull force of the seat belt 5a is absorbed by a body of a passenger, so the loads Fi, Fo, Ri, and Ro acting on each of the areas of front inner area, front outer area, rear inner area and rear inner area of the seat portion 1a are not changed before and after fastening the seat belt 5a.

As illustrated in FIG. 2C, when an adult is seated lean to the anchor side in the rear portion of the seat 1, the loads, Fi, Fo, Ri and Ro, acting on the each of the areas of the front inner area, front outer area, rear inner area and rear outer area of the seat portion 1a indicate 4 kg, 5 kg, 9 kg and 18 kg, respectively.

In addition, as illustrated in FIG. 2D, when an adult is seated lean to the anchor side in the middle portion of front and rear of the seat 1, the loads, Fi. Fo, Ri and Ro acting on each of the areas of the front inner area, front outer area, rear inner area and rear outer area of the seat portion 1a indicate 8 kg, 9 kg, 6 kg and 15 kg, respectively.

From those load examples, when an adult is seated lean to the anchor side in the rear portion of the seat 1 and the anchor side in the middle portion of the front and rear of the seat 1, the following expressions are reached.

(When an Adult is Seated Lean to the Anchor Side in the Rear Portion of the Seat 1)

The load ratio of the right and left in the front portion of the seat portion 1a, i.e., the ratio of the load Fo acting on the front outer area to the load Fi acting on the front inner area, (Fo/Fi), is $$Fo/Fi < 1.6 \tag{7}$$

The load ratio of the right and left of the entire seat portion 1a, i.e., the ratio of the total value of the load Fo acting on the front outer area and the load Ro acting on the rear outer area to the load Fi acting on the front inner area and the load Ri acting on the rear inner area, ((Fo+Ro)/(Fi+Ri)), is $$(Fo+Ro)/(Fi+Ri) < 1.8 \tag{8}$$

The load ratio of the right and left in the rear portion of the seat portion 1a, i.e., the ratio of the load Ro acting on the rear outer area to the load Ri acting on the rear inner area, (Ro/Ri), is $$Ro/Ri < 3 \tag{9}$$

(When an Adult is Seated Lean to the Anchor Side in the Middle Portion of the Front and Rear of the Seat 1)

The load ratio of the right and left in the front portion of the seat portion 1a, i.e., the ratio of the load Fo acting on the front outer area to the load Fi acting on the front inner area, (Fo/Fi), is $$Fo/Fi < 1.6 \tag{10}$$

The load ratio of the right and left of the entire seat portion 1a, i.e., the ratio of the total value of the load Fo acting on the front outer area and the load Ro acting on the rear outer area to the load Fi acting on the front inner area and the load Ri acting on the rear inner area, ((Fo+Ro)/(Fi+Ri)), is $$(Fo+Ro)/(Fi+Ri) < 1.8 \tag{11}$$

The load ratio of the right and left in the rear portion of the seat portion 1a, i.e., the ratio of the load Ro acting on the rear outer area to the load Ri acting on the rear inner area, (Ro/Ri), is $$Ro/Ri < 3 \tag{12}$$

Considering the above expressions (1) to (12), as to the load ratio of the right and left in the front portion of the seat portion 1a, (Fo/Fi), from the comparison of the expressions (1) and (4) indicating a child with the expressions (7) and (10) indicating an adult, more particularly, the load ratio, (Fo/Fi), is less than 1.6 for an adult and the load ratio, (Fo/Fi), is over 1.2 or 1.9 for a child. Therefore, if the load ratio, (Fo/Fi), is 1.9 or more, it can be judged as a child regardless of the position of the seat 1.

In addition, as to the load ratio of the right and left of the entire seat portion $1a$, ((Fo+Ro)/(Fi+Ri)), from the comparison of the expressions (2) and (5) indicating a child with the expressions (8) and (10) indicating an adult, similarly, when the load ratio of the right and left of the entire seat portion $1a$, ((Fo+Ro)/(Fi+Ri)), is 2.0 or more, it can be judged as a child regardless of the position of the seat 1. Therefore, those values can be used a part of the above mentioned thresholds.

The judging circuit 6 outputs the judgment result of the passenger seated on the seat 1 to the airbag control portion $9a$, which controls the operation of the airbag 9.

If the airbag control portion $9a$ receives the judgment result from the judging circuit 6 that the passenger is an adult, the airbag control portion $9a$ sets the airbag 9 to a normal operation standby state. On the contrary, if the airbag control portion $9a$ receives the judgment result from the judging circuit 6 that the passenger is a child, the airbag control portion $9a$ gives restriction to the operation of the airbag 9, so as to protect a child from being damaged by the operation of the airbag 9.

Consequently, if it is likely to make an impact on the passenger, the airbag 9 is immediately operated when it is judged that an adult is seated, and the operation of the airbag 9 is controlled when it is judged that a child is seated.

Furthermore, the airbag control portion $9a$ outputs a condition signal, which shows whether the control state of the airbag 9 is a normal operation standby state or a regulated state, to an airbag deploymentable display lamp $9b$ based on the judgment result from the judging circuit 6.

The airbag deploymentable display lamp $9b$ illuminates a predetermined lamp based on the input condition signal. Thereby, the judgment result of the passenger seated on the seat 1 is obtained by the judging circuit 6, and it can be known whether the airbag is deployed or not when having an impact.

The operations of the vehicle passenger detecting device 10 according to the first embodiment of the present invention will be explained with reference to the flow chart shown in FIG. 3.

If a driver is seated on a driver seat, and turns on an ignition switch, detection signals are output to the judging circuit 6 from the load sensors 3(Fo, Fi, Ro, Ri) of the seat 1 of a front passenger seat, for example, and the judging circuit 6 calculates passenger weight W of the seat 1 from this output signals (step S1).

After calculating the passenger weight W, the judging circuit 6 waits for the output signal from the buckle switch 7 (step S2). If the judging circuit 6 detects the fastening of the seat belt $5a$ by receiving the output signal from the buckle switch 7, determines whether the passenger weight W is within a predetermined range (from lower critical value $\alpha$th to upper critical value $\beta$th) or not.

For this determination, the judging circuit 6 compares the lower critical value $\alpha$th, which is stored in the EEPROM 8 for the judgment of an adult and a child, with the passenger weight W (step S3). If the comparison result that this passenger weight W is less than the lower critical value $\alpha$th is obtained, the judging circuit 6 judges the passenger on the seat 1 is a child, and outputs to the airbag control portion $9a$ accordingly (step S4).

On the other hand, if the comparison result that the passenger weight W is the lower critical value $\alpha$th or more is obtained at step S3, the judging circuit 6 compares the passenger weight W and the upper critical value $\beta$th (step S5).

This upper critical value $\beta$th can be, for example, the sum of the weight of the heaviest CRS in CRS prescribed by a regulation, Wcrs, the maximum fastening force prescribed by a regulation of a seat belt, cinch (30 pounds: about 13.62 kg) and the maximum weight of a child prescribed by a regulation, Wchild.

If the comparison result that the passenger weight W is larger than the upper critical value $\beta$th is obtained at step S5, the judgment circuit 6 judges that the passenger of the seat 1 is an adult, and outputs to the airbag control portion $9a$ accordingly (step S6).

If the comparison result that the passenger weight W is less than the upper critical value $\beta$th is obtained at step S5, i.e., it is judged that the passenger weight W is within a predetermined range (from lower critical value $\alpha$th to upper critical value, $\beta$th), the judgment is performed by using the front outer load Fo acting on the outer area in the front portion of the seat portion $1a$, the load ratio of the right and left in the front portion of the seat portion $1a$, (Fo/F1), and the load ratio of the right and left of the entire seat portion $1a$, ((Fo+Ro))/(Fi+Ri)).

More particularly, at step S7, the judging circuit 6 compares the front outer load Fo to be obtained from the front outer load sensor 3Fo with the first threshold $\gamma$th. The minimum value of the front outer load Fo produced by the fastening of the seat belt $5a$ when installing the CRS is adopted as the first threshold $\gamma$th, and the minimum value of the front outer load can be set to 3 kg, for example. In addition, at step S7, the judging circuit 6 calculates the load ratio F (Fo/Fi) of the front outer load Fo to be obtained from the front outer load sensor 3Fo and the front inner load Fi to be obtained from the front inner load sensor 3Fi, and compares the load ratio F (Fo/Fi) of the right and left with the second threshold Fth. One of the above values, 1.9, can be adopted as the second threshold Fth.

At step 7, if the comparison results that the front outside load Fo is the first threshold $\gamma$th or more, and the load ratio F (Fo/Fi) of the right and left is the second threshold Fth are obtained, the judgment circuit 6 outputs the judgment result that the passenger is a child to the airbag control portion $9a$ (step S4).

At the judgment of step S7, the front outer load Fo and the first threshold $\gamma$th are compared; thereby, the misjudgment by an adult seated lean to one side as described above is prevented.

In addition, if the negative judgment result is obtained at step S7, the load ratio A ((Fo+Ro)/(Fi+Ri)) of the right and left of the entire seat portion $1a$, and the third threshold Ath are compared.

Prior to this comparison, the judging circuit 6 obtains the sum of the front outer load Fo to be obtained from the front outer load sensor 3Fo and the rear outer load Ro to be obtained from the rear outer load sensor 3Ro, (Fo+Ro), and obtains the sum of the front inner load Fi to be obtained from the front inner load sensor 3Fi and the rear inner load Ri to be obtained from the rear inner load sensor 3Ri, (Fi+Ri). After that, the judging circuit 6 obtains the load ratio A ((Fo+Ro)/(Fi+Ri)) of the right and left of the ratio of the both sum, and compares the load ratio A ((Fo+Ro)/(Fi+Ri)) with the third threshold Ath (step S8).

As the third threshold Ath, 2.0, which is the other of the above values, can be adopted. In this case, if the load ratio A ((Fo+Ro))/(Fi+Ri)) is 2.0 or more, the judgment result of a child is output to the airbag control portion $9a$ (step S4).

On the contrary, if the load ratio A ((Fo+Ro))/(Fi+Ri)) is less than 2.0, the judgment result of an adult is output to the airbag control portion $9a$ (step S6).

According to the vehicle passenger detecting device 10 according to the first embodiment of the present invention, as stated above, the front outer load Fo of the seat portion 1a and the first threshold γth are compared, the load ratio F(Fo/Fi) of the right and left of the seat portion 1a and the second threshold Fth are compared, and also the load ratio A ((Fo+Ro)/(Fi+Ri)) of the right and left of the entire seat portion 1a and the third threshold Ath are compared, and then it is judged whether the passenger is an adult or a child based on each of the comparison results. Accordingly, the misjudgment by an adult seated lean to one side can be certainly prevented; thus, an accurate judgment can be performed compared with a conventional device.

Figure 3:
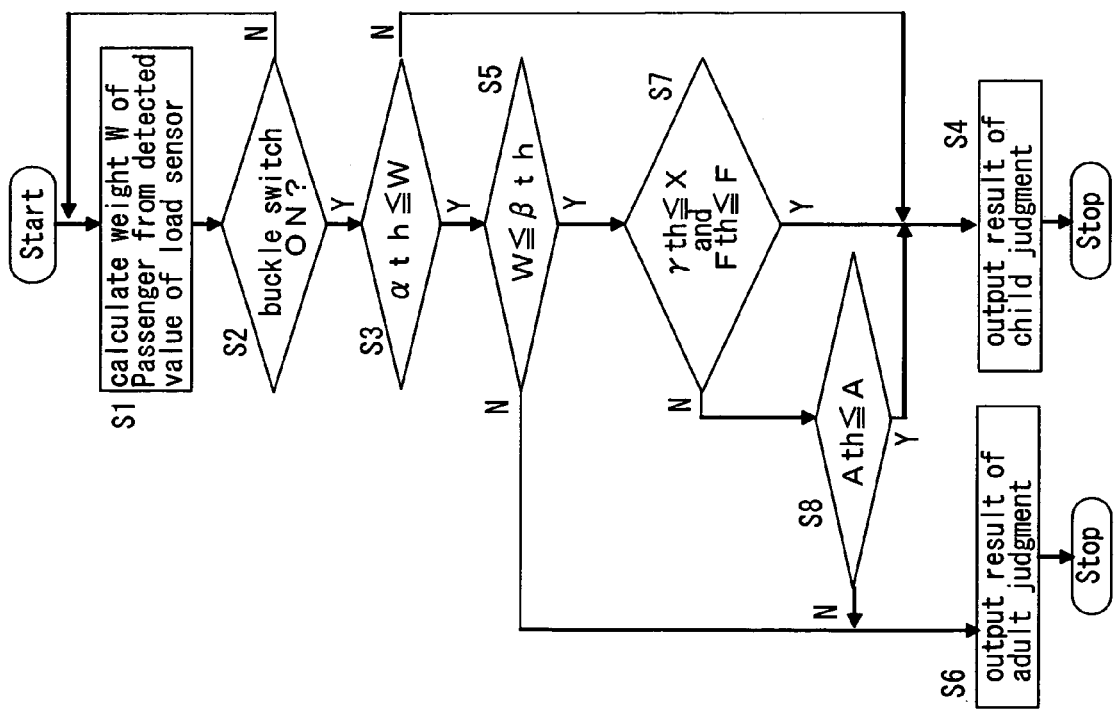
FIG. 3 is a flow chart showing operations of a vehicle passenger detecting device according to a first embodiment of the present invention.

In the flow chart shown in FIG. 3, the judgment using the third threshold (step S8) is performed when the negative result is obtained as a result of the judgment (step S7) using the first threshold and the second threshold, but the both steps S7 and S8 can be executed in parallel, in addition, if the negative result is obtained at the judgment of step S8, step S7 can be performed.

Second Embodiment

Hereinafter, a vehicle passenger detecting device 10 according to a second embodiment of the present invention will be explained. In addition, the reference numerals used in the first embodiment are used for the same portions in the following embodiment; thus, the detailed explanation will be omitted.

Figure 4:
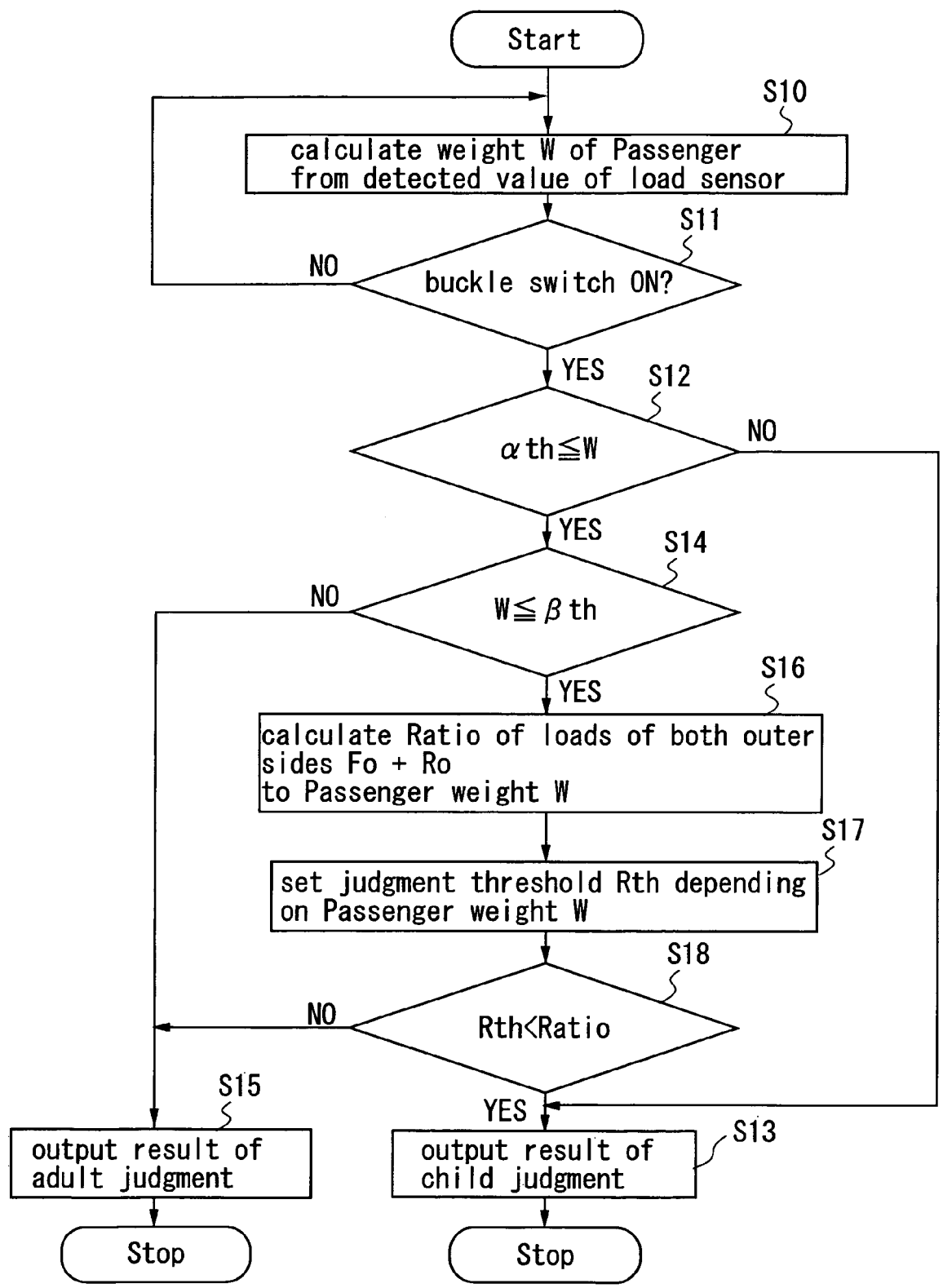
FIG. 4 is a flow chart showing operations of a vehicle passenger detecting device according to a second embodiment of the present invention.

FIG. 4 is a flow chart illustrating a passenger detecting process according to the second embodiment of the vehicle passenger detecting device 10.

In this passenger detecting process, at first, if a driver is seated on a driver seat, and turns on an ignition switch, detection signals are output to a judging circuit 6 from load sensors 3 (3Fo, 3Fi, 3Ro and 3Ri) of a seat 1 of a passenger seat, for example. The judging circuit 6 calculates passenger weight W from the output signals (step S10).

After calculating the passenger weight W, the judging circuit 6 waits for an output signal from a buckle switch 7 (step S11). When the output signal is not input from the buckle switch 7 (in case of NO at step S11), the flow goes back to step S10.

On the contrary, if the output signal is input from the buckle switch 7 (in case of YES at step S11), the judging circuit 6 judges that the seat belt 5a is fastened, and judges whether the passenger weight W is within a predetermined range (from lower critical value αth to upper critical value βth) or not.

For this judgment, the judging circuit 6, first, compares the lower critical value αth, which is stored in the EEPROM 8 for judging an adult and a child, with the passenger weight W (step S12).

If the passenger weight W is less than the lower critical value αth (in case of NO at step S12), the judging circuit 6 judges that the passenger of the seat 1 is a child, and outputs to the airbag control portion 9a accordingly (step S13).

On the contrary, if the passenger weight W is the lower critical value αth or more (in case of YES at step S12), the judging circuit 6 compares the passenger weight W with the upper critical value βth (setp S14).

In this case, the upper critical value βth can be, for example, adopted as the sum of the weight of the heaviest CRS in CRS prescribed by a regulation, Wcrs, the maximum fastening force prescribed by a regulation of a seat belt, cinch (30 pounds: about 13.62 kg), and the maximum child weight prescribed by regulation, Wchild.

If the passenger weight W is larger than the upper critical value βth (in case of NO at step S14), the judging circuit 6 judges that the passenger is an adult, and outputs to the airbag control portion 9a accordingly (step S15).

On the contrary, if the passenger weight W is the upper critical value βth or less (in case of YES at step S14), more particularly, if the passenger weight is within a predetermined range (from lower critical value αth to the upper critical value βth), the judgment is performed by using Ratio of the total value of the front outer load Fo acting on the outer area in the front portion and the rear outer load Ro acting on the outer area in the rear portion of the seat portion 1a of the passenger weight W.

More particularly, the judging circuit 6 calculates the Ratio of the total value of the load Fo acting on the front outer area and the load Ro acting on the rear outer area to the passenger weight W (step S16).

This Ratio is obtained by the following formula (13).

$$\text{Ratio} = (Fo + Ro)/W \tag{13}$$

Next, the judging circuit 6 sets a judgment threshold Rth depending on the size of the calculated passenger weight W (step S17).

This judgment threshold Rth is previously set depending on the size of the passenger weight W, and is stored in the EEPROM 8.

If a predetermined judgment threshold Rth is set, the judging circuit 6 read out this judgment threshold Rth from the EEPROM 8, and judges whether the Ratio is larger than this set judgment threshold Rth or not (step S18).

If the Ratio is smaller than the judgment threshold Rth (in case of No at step S18), the judging circuit 6 judges that the passenger of the seat 1 is an adult, and outputs to the airbag control portion 9a accordingly (step S15).

On the contrary, if Ratio is larger than the judgment threshold Rth (in case of YES at step S18), the judging circuit 6 judges the passenger of the seat 1 is a child, and outputs to the airbag control portion 9a accordingly (step S13).

Figure 5:
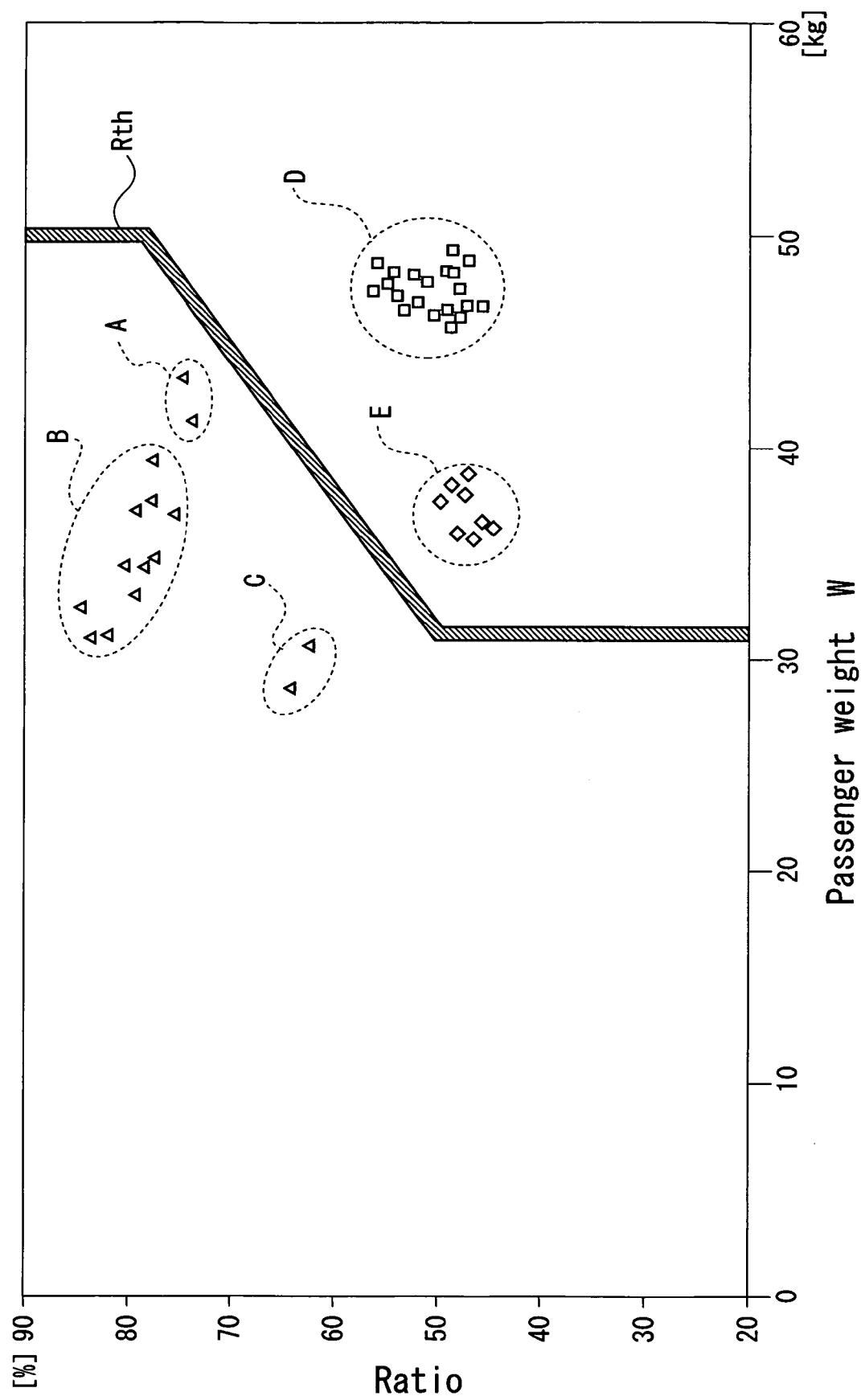
FIG. 5 is a graph illustrating a specific example of judgment of the vehicle passenger detecting device according to the second embodiment of the present invention.

FIG. 5 shows a graph illustrating a specific example of passenger detecting in this second embodiment.

In this graph, if the passenger weight W (shown by X axis in FIG) is lower than the lower critical value 31 kg of a predetermined range, it is judged that the passenger is a child by only the passenger weight W.

Moreover, if the passenger weight W is larger than the upper critical limit 50 kg of a predetermined rage, it is judged that the passenger is an adult by only the passenger weight W.

If the passenger weight W is within a predetermined range (31 kg to 50 kg), the judgment is performed by means of a feature that the front outer load Fo acting on the front outer area and the rear outer load Ro acting on the rear outer area of the seat 1 are increased by the tonicity produced in the seat belt 5a between the CRS and the anchor 5c when fastening the CRS by the seat belt 5a.

More particularly, if the Ratio of the total value of the front outer load Fo and the rear outer load Ro of the passenger weight W (shown by Y axis in FIG) is the judgment threshold (shown by the thick line in FIG) or more, the seated passenger is judged as a child.

In this case, the judgment threshold Rth is changed depending on the size of the passenger weight W. In addition, the level of this change is previously set. In this case, for example, if the passenger weight W is 31 kg, the Ratio is about 50%, if the passenger weight W is 40 kg, the Ratio is about 64%, and if the passenger weight W is 50 kg, the Ratio is about 78%.

Here, a group A shown in FIG. 5 is when a 6 years dummy doll is seated on a CRS and fastened by 30 pounds. A group B shown in FIG. 5 is when a 3 years dummy doll is seated on a CRS and fastened by 30 pounds. A group C shown in FIG. 5 is when a 6 years dummy doll is seated on a CRS and fastened by 4 pounds. The ratio in each of the groups is the judgment threshold Rth or more.

Moreover, a group D shown in FIG. 5 is when an adult female dummy doll is seated. A group E shown in FIG. 5 is when an adult woman is sated. The ratio in each of the groups is the judgment threshold Rth or less.

As stated above, the judgment threshold Rth is changed depending on the size of the passenger weight W, so even though the CRS is fastened by the seat belt $5a$, and the total load acting on the total area of the seat portion $1a$ of the seat 1 becomes a load corresponding to an adult, it can be appropriately determined whether the seated passenger is a child or not.

Especially, in case of a relatively heavy six years child and the like, it is judged by using the judgment value Rth corresponding to the weight, so the relatively heavy six years child can be judged in distinction from a relatively lightweight adult. Accordingly, the control of the airbag 9 can be appropriately conducted.

In addition, with respect to a relatively lightweight adult (adult woman and the like), the misjudgment with a child can be prevented by providing an allowance for the judgment value Rth. As described above, the embodiments of the present invention are described with reference to the drawings, but these embodiments are the examples of the present invention. Therefore, the present invention is not limited to the structures of the embodiments, and various changes in form and details may be made in the present invention without departing from the sprit and scope of the present invention.

For example, in the above embodiments, the lower critical value $\alpha$th is set to 31 kg, the upper critical value $\beta$th is set to 50 kg, the first threshold $\gamma$th is set to 3 kg, the second threshold Fth is set to 1.9 and the third threshold Ath is set to 2.0, but these values are not limited thereto. These values can be set to the most appropriate values by an experiment.

Moreover, the level of the change in the judgment threshold Rth was described as one example in the second embodiment, but the level of the change in the judgment threshold Rth is not limited thereto, and it can be appropriately set.

According to the present invention, each of load ratio with a seat belt fastened state is obtained, and it is judged whether a seated passenger is a child or not by the comparison of the load ratio with each of thresholds. Therefore, it can be judged whether a seated passenger is a child or an adult, and a miss judgment by slight uneven sitting of an adult can be certainly prevented.

What is claimed is:

1. A vehicle passenger detecting device comprising:
a judging circuit, which judges whether a passenger seated on a seat is a child or not, based on a load acting on each of areas of a front inner area, a front outer area, a rear inner area and a rear outer area of a seat portion of the seat for a vehicle,
wherein a vehicle exterior side of the seat is disposed with a anchor, which connects a seat belt provided with a tongue plate to a body of the vehicle, and a vehicle interior side of the seat is disposed with a buckle in which the tongue plate is releasably locked,
wherein the front inner area of the seat portion is provided with a front inner area sensor which detects the load acting on the front inner area, the front outer area of the seat portion is provided with a front outer area sensor which detects the load acting on the front outer area, the rear inner area of the seat portion is provided with a rear inner area sensor which detects the load acting on the rear inner area, and the rear outer area of the seat portion is provided with a rear outer area sensor which detects the load acting on the rear outer area,
wherein the judging circuit, with a fastened state of the seat belt, is configured to compare a total load value obtained by the area sensors of an entire area with critical values, which prescribe a predetermined range, and to judge whether or not the total load value is within the predetermined range, and when the total load value is within the predetermined range, the judging circuit is configured to compare a front outer load value obtained by the front outer area sensor with a first threshold, and compare a ratio of the front outer load value obtained by the front outer area sensor to a front inner load value obtained by the front inner area sensor with a second threshold, wherein if the front outer load value is the first threshold or more and the ratio of the front outer load value to the front inner load value is the second threshold or more, the judging circuit is configured to judge that a seated passenger is a child, or the judging circuit is configured to compare the ratio of both outer load values obtained by both of the outer area sensors to both inner load values obtained by both of the inner area sensors with a third threshold, wherein if the ratio of both outer load values to both inner load values is the third threshold or more, the judging circuit is configured to judge that a seated passenger is a child.

2. The vehicle passenger detecting device according to claim 1, wherein an upper critical value, which prescribes an upper limit of the predetermined range, is obtained by a sum of a weight of a heaviest child restraint system in child restraint systems prescribed by a regulation, a maximum fastening force of a child restraint system by a seat belt prescribed by a regulation, and a maximum weight of a child using a child restraint system prescribed by a regulation.

3. The vehicle passenger detecting device according to claim 1, wherein the first threshold is set to a minimum value of the front outer load value obtained by the front outer area sensor when fastening of the child restraint system by the seat belt.

4. The vehicle passenger detecting device according to claim 3, wherein the first threshold is set to about 3 kg.

5. The vehicle passenger detecting device according to claim 1, wherein the second threshold is set to about 1.9.

6. The vehicle passenger detecting device according to claim 1, wherein the third threshold is set to about 2.0.

7. A vehicle passenger detecting device comprising;
a judging circuit, which judges whether a passenger seated on a seat is a child or not based on a load acting on each of areas of a front inner area, a front outer area, a rear inner area and a rear outer area of a seat portion of the seat for a vehicle,
wherein a vehicle exterior side of the seat is disposed with a anchor, which connects a seat belt provided with a tongue plate to a body of the vehicle, and a vehicle interior side of the seat is disposed with a buckle in which the tongue plate is releasably locked,
wherein the front inner area of the seat portion is provided with a front inner area sensor which detects the load acting on the front inner area, the front outer area of the seat portion is provided with a front outer area sensor which detects the load acting on the front outer area, the rear inner area of the seat portion is provided with a rear inner area sensor which detects the load acting on the rear inner area, and the rear outer area of the seat portion is provided with a rear outer area sensor which detects the load acting on the rear outer area, wherein the judging circuit, with a fastened state of the seat belt, is configured to compare a total load value obtained by the area sensors of an entire area with critical values, which prescribe a predetermined range, and to judge whether the total load value is within a predetermined range or not, and when the total load value is within the predetermined range, the judging circuit is configured to compare a ratio of the load values of both outer areas obtained by both of the outer area sensors of the total load value with a predetermined threshold, and to judge a seated passenger is a child if the ratio of the load values of both outer areas of the total load is the predetermined threshold or more, and the judging circuit is configured to change the threshold depending on a size of the total load value.

8. A vehicle passenger detecting device comprising:

a judging circuit, which judges whether a passenger seated on a seat is a child or not based on a load acting on each of areas of a front inner area, a front outer area, a rear inner area and a rear outer area of a seat portion of the seat for a vehicle, wherein the front inner area of the seat portion is provided with a front inner area sensor which detects the load acting on the front inner area, the front outer area of the seat portion is provided with a front outer area sensor which detects the load acting on the front outer area, the rear inner area of the seat portion is provided with a rear inner area sensor which detects the load acting on the rear inner area, and the rear outer area of the seat portion is provided with a rear outer area sensor which detects the load acting on the rear outer area, wherein the judging circuit is configured to compare a total load value obtained by the area sensors of an entire area with critical values, which prescribe a predetermined range, and to judge whether or not the total load value is within the predetermined range, and when the total load value is within the predetermined range, the judging circuit is configured to compare a front outer load value obtained by the front outer area sensor with a first threshold, and compare a ratio of the front outer load value obtained by the front outer area sensor to a front inner load value obtained by the front inner area sensor with a second threshold, wherein if the front outer load value is the first threshold or more and the ratio of the front outer load value to the front inner load value is the second threshold or more, the judging circuit is configured to compare the ratio of both outer load values obtained by both of the outer area sensors to both inner load values obtained by both of the inner area sensors with a third threshold, wherein if the ratio of both outer load values to both inner load values is the third threshold or more, the judging circuit is configured to judge that seated passenger is a child.

\* \* \* \* \*